UNITED STATES PATENT OFFICE.

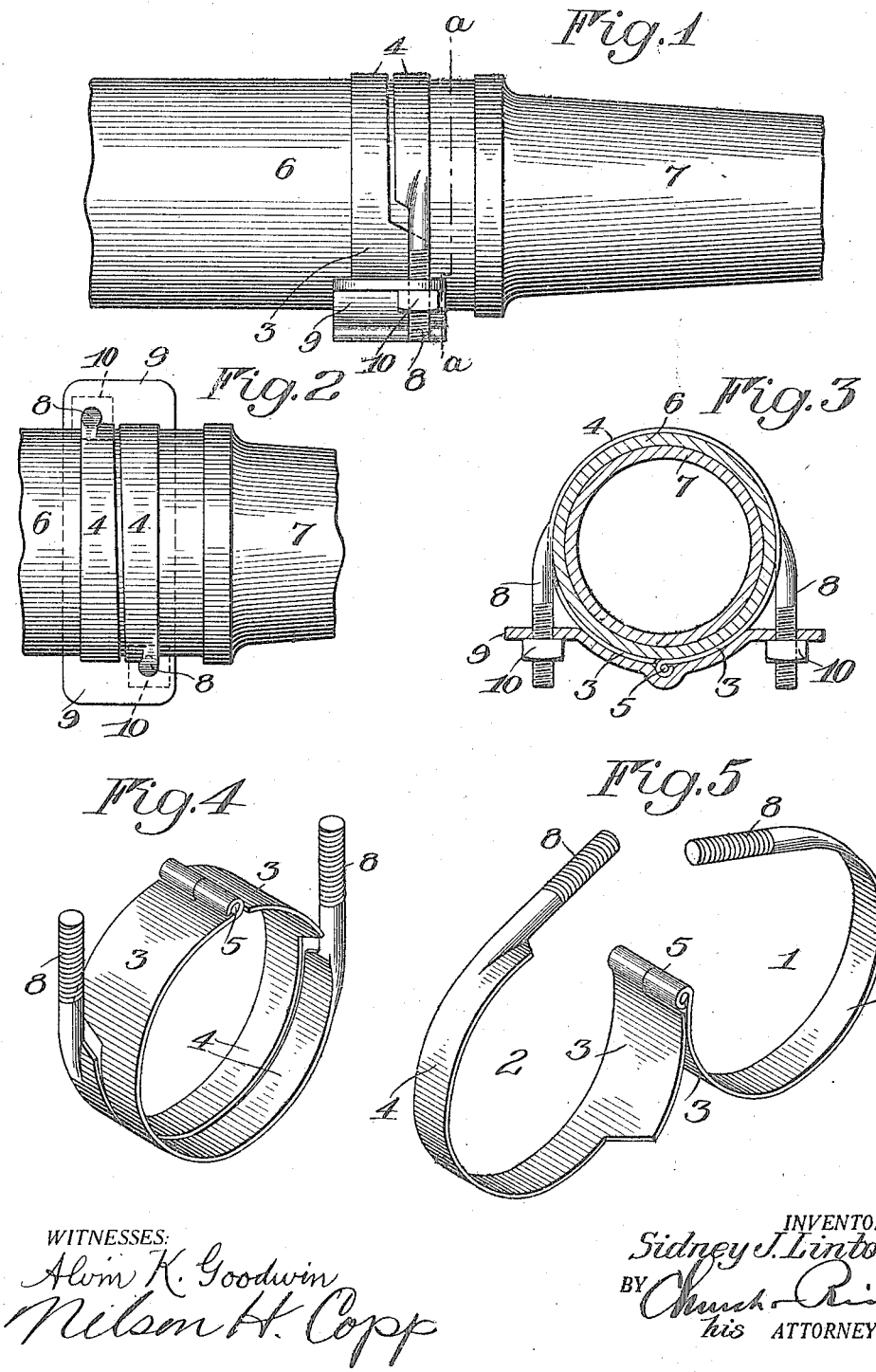

SIDNEY J. LINTON, OF GROVELAND, NEW YORK.

HOSE-CLAMP.

1,270,960.  Specification of Letters Patent.  Patented July 2, 1918.

Application filed March 26, 1918. Serial No. 224,839.

*To all whom it may concern:*

Be it known that I, SIDNEY J. LINTON, of Groveland, in the county of Livingston and State of New York, have invented certain new and useful Improvements in Hose-Clamps; and I do hereby declare the following to be a full, clear, and exact description of the same, reference being had to the accompanying drawings, forming a part of this specification, and to the reference-numerals marked thereon.

This invention relates to a clamping device adapted to connect a fire or other hose to a nozzle, or to a coupling connecting two hose lengths, or for analogous uses, and has for its object to provide a simple, efficient, durable and inexpensive clamp of this character which may be quickly applied or disconnected.

To these and other ends the invention consists in certain improvements and combinations of parts, all as will be hereinafter more fully described, the novel features being pointed out in the claims at the end of the specification.

In the drawings a preferred embodiment of the invention is illustrated, in which similar reference characters indicate corresponding parts in the several views.

Figure 1 is a side elevation showing a nozzle coupled to a hose by this improved clamp device;

Fig. 2 is a top plan view of the applied clamp;

Fig. 3 is a vertical cross section taken on the line *a—a* of Fig. 1;

Fig. 4 is a perspective view of the clamping band, the parts being shown in their operative position, and Fig. 5 is a perspective view showing the parts of the band opened.

This improved clamp device includes a hose clamping band comprising two flexible curved members 1, 2, the sheet or plate metal parts of which preferably have similar form adapting them for inexpensive manufacture and convenient interchangeable assembling for use. Each band portion 1, 2, has a broad end part 3 and a narrower end part 4, and the parts 3, 3 of both members are hinged together at 5 in a manner placing the hinge knuckle outside to allow close fitting of all parts of the broader band ends 3, upon a hose 6 for securing it to a discharge nozzle 7, or to a tube coupling two hose or pipe sections in a manner readily understood without further illustration or description. When the band is applied around the hose 6, the narrow band portions 4, 4 oppose each other edge to edge, as shown in Figs. 1 and 2 of the drawings.

Any approved means may be used for compressing the applied band around and upon the hose, a preferred means being bolt ends 8, 8, welded to the outer ends of the narrower band portions 4, 4, and passing through holes in a yoke plate 9 applied upon the broader portions 3 of the band members 1, 2, and having a transverse recess receiving the projecting knuckle of the hinge 5. Nuts 10 are applied upon the bolt ends 8 outside the yoke 9 and when screwed down cause the encircling parts of the band to compress the inclosed hose pipe.

There are decided advantages in giving the plate portions 3, 4 of the two clamping band members 1, 2 a similar form. One advantage is that said plate portions 3, 4 may be inexpensively produced by using the same cutting and forming dies which leave the halved eye portions of the hinge 5 ready to receive the pintle connecting the two band members and permits opening of the members upon the hinge, as shown in Fig. 5, if this be necessary for more conveniently applying the band around the hose 6. When the coupling band is thus applied its two narrower portions 4, 4, together have about the same width as the band portions 3, which imparts a symmetrical finish to the entire clamp. Another advantage of the similar form of the two clamping portions is that when said parts are applied around the hose 6, they do not cross each other at any point and consequently their entire inner faces rest snugly against the hose so that when the clamp is secured thereon by tightening the bolt nuts 10 upon the yoke 9, a maximum frictional grip of the clamp is obtained upon the hose to maintain a most secure hold of it upon the nozzle 7, or other pipe or object to which it may be applied.

I claim as my invention:

1. A hose clamp comprising a circumferential band including two flexible curved parts each having a broad and a narrow portion and hinged together at the ends of their broad portions and having attaching means at the ends of their narrow portions which lie edge to edge when the band is applied around a hose, and means adapted to draw upon said narrow portions to tighten the applied band.

2. A hose clamp comprising a circumferential band including two flexible curved parts each having a broad and a narrow portion and both hinged together at the ends of their broad portions, and having bolt ends forming attaching means at the ends of their narrow portions, a yoke applicable upon the hinged portions of the band and receiving the bolt ends, and tightening nuts on the bolt ends outside the yoke.

SIDNEY J. LINTON.

Copies of this patent may be obtained for five cents each, by addressing the "Commissioner of Patents, Washington, D. C."